April 1, 1930.   C. A. J. ANDERSEN   1,752,285
BEET TOPPER
Filed May 12, 1926   2 Sheets-Sheet 1
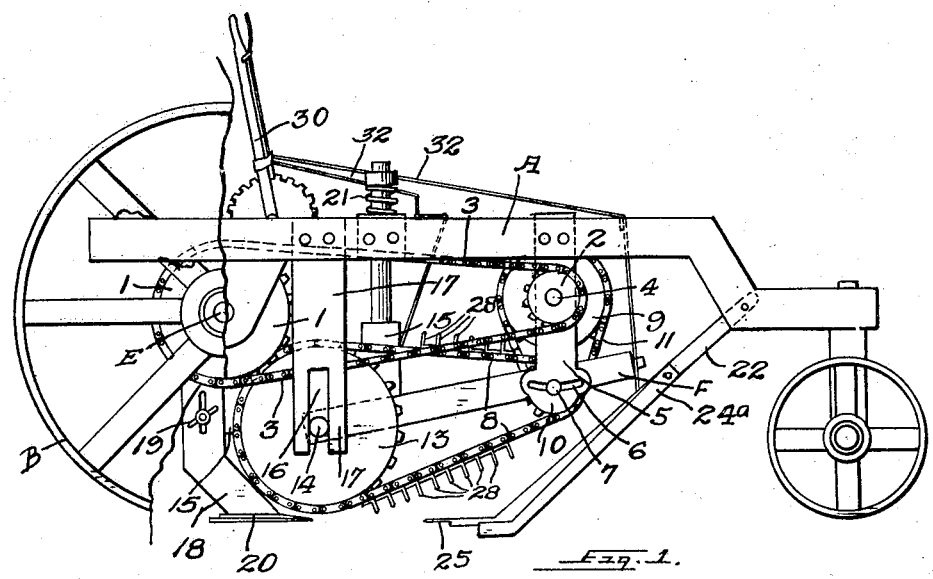
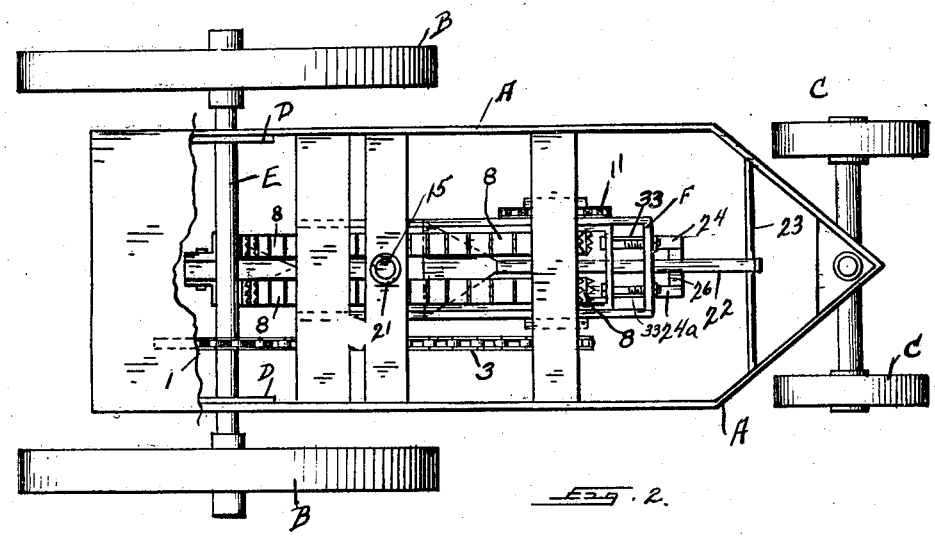
Inventor
Carl A. J. Andersen
By   J. M. Thomas
Attorney April 1, 1930.  C. A. J. ANDERSEN  1,752,285
BEET TOPPER
Filed May 12, 1926   2 Sheets-Sheet 2
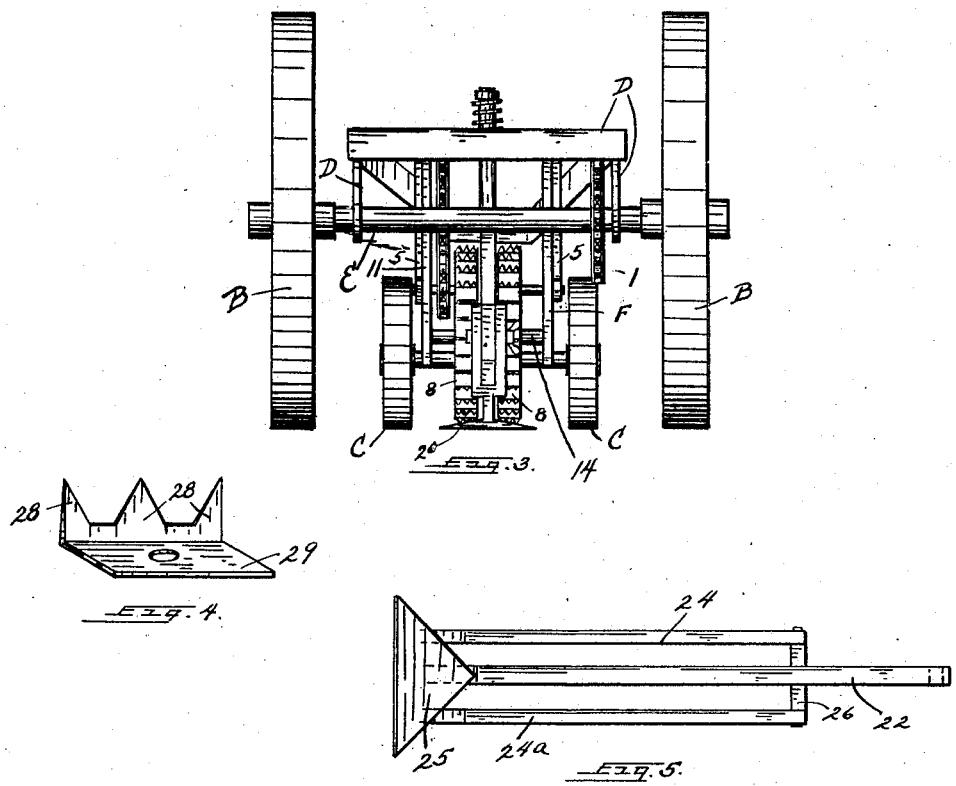

Patented Apr. 1, 1930

1,752,285

UNITED STATES PATENT OFFICE

CARL A. J. ANDERSEN, OF SALT LAKE CITY, UTAH

BEET TOPPER

Application filed May 12, 1926. Serial No. 108,522.

My invention relates to beet toppers and has for its object to provide a beet topper which will top beets in the ground before they are dug by clipping away a portion of the foliage and which machine will then automatically adjust itself in order that the desired amount of the body of the individual beet will be cut off with the foliage.

These objects I accomplish with the machine illustrated in the accompanying drawings in which similar letters and numerals of reference indicate like parts throughout the several views, and as described in the specification forming a part of this application and pointed out in the appended claim.

In the drawings in which I have shown a substantial embodiment of my invention, Figure 1 is a side elevation of the machine, parts cut away. Figure 2 is a plan view of the machine, with part of the frame cut away. Figure 3 is a rear elevation of the machine with parts omitted. Figure 4 is a view in perspective of the foliage-holding blades secured on the links of the chain. Figure 5 is a plan view of the foliage-clipping blade and support.

The present invention consists of a main frame A, preferably shaped as shown and made of metal, which frame is carried on the wheels B at the rear and the wheels C in front. The rear of the said frame A is supported by the U-shaped brace D which rests on the axle E of the said wheels B. The braces for maintaining the position of the foot of said U-shaped brace D and axle E relative to said main frame A are omitted. The topping mechanism is secured on said axle E and said axle is operatively connected with said wheels B. The topping mechanism is driven by the axle E through the sprocket wheel 1, which is secured on said axle E, and the sprocket wheel 2 with their chain 3 carried thereon. The said sprocket wheel 2 is secured on a shaft 4 which is journalled in the vertical standards 5 secured at their upper portions to the main frame A. Arc-shaped slots 6 are cut through the lower portions of said standards 5 to allow the counter-shaft 7 to be laterally moved in the slots to tighten the foliage-engaging belts 8. A U-shaped belt tightener frame F is mounted with both of the legs bored to receive the shaft 14 and also slotted farther up the legs to receive the shaft 7. Threaded draw bolts 33 are placed through holes in the end of the frame F and are secured to an inner U-shaped member F¹ carried within the frame F; the movement of the inner frame by the turning of the bolts 33 either tightens or loosens the chains as desired. Sprocket wheels 9 and 10 are secured on the respective shafts 4 and 7 on which the belt 11 is engaged to impart the motion of said shaft 4 to the shaft 7. Sprocket wheels are secured on the shaft 7 to engage with the foliage belts 8, which also pass over the sprocket wheels 13 that are secured on the shaft 14. Blades 29 are secured on the outer side of the links in the chain 8, and pointed teeth 28 are formed on the outer side of the said blades adapted to pierce the foliage of the beet and hold it for the foliage-cutting blade 25. Between the said sprocket wheels 13, mounted on shaft 14, is carried the topper beam 15, the same being vertically movable with the shaft 14 slidably mounted in the recesses 16 cut in the standards 17, which are secured at their upper ends to the frame A. The vertical cutter portion 18 of the beet topping blade 20 is adjustably fastened on the beam 15 by the wing nut 19. The blade 20 and vertical cutter 18 are held in the soil by their weight. The spiral spring 21 carried on the upper portion of the beam 15 is to prevent the blade from dropping too deep into the soil. The foliage clipping or cutting blade 25 is supported by standard 22 which is pivoted on a cross bar 23 secured to the front portion of said frame A. The foliage-cutting blade 25 is provided with lifting arms 24 and 24ª which are pivoted to a cross support 26 secured on the standard 22 so that when a beet is to be trimmed of some of its foliage which has grown rank and high, and when such beet is out of the line of the adjacent beets, the foliage-cutting blade 25 will be raised by the free ends of the lifting arms 24 and 24ª engaging the rear face of said blade 25, and raising the standard 22 with the blade 25, thus trimming off most of its foliage and leaving the balance to be cut off by the topping blade 20. A lever 30 and cables 31 and 32 are provided to lift the cutting blades 20 and 25 clear of the ground in moving the machine from one field to another.

The operation of my machine is as follows:—

With the machine drawn along and above a row of matured beets the foliage-cutting blade 25 will cut most of the foliage off of the beet and leave the stems of the foliage on the beet. The chains 8 will be pressed downwardly by the weight of the sprocket wheels 13 and the topping blade 20 will top the beets. Motion will be imparted to said sprocket wheels 13 by the traction of the wheels A through the train of sprocket wheels 1, 2, 9, 10 and 13, and the belts or chains 3, 11 and 8. As the sprocket wheels 13 are moved over the individual beet, the topping blade 20 is raised or lowered by the shaft 14 when it is raised or lowered in the slots 16 as the chains 8 pass over the foliage and crown of the beet.

Having thus described my invention and its operation I desire to secure by Letters Patent and claim:—

A beet topper comprising a wheel-supported frame, an axle on which the rear portion of said frame is supported, a sprocket wheel secured on said axle, vertical standards secured to the front portion of said frame, a shaft journalled in said vertical standards, a sprocket wheel carried on said shaft, a sprocket chain carried on said sprocket wheel, a belt tightener frame supported on said standards, a shaft journalled in said tightener frame, and movable in arc-shaped slots cut in said vertical standards, means to impart motion from the first-mentioned shaft to the last-mentioned shaft, slotted standards secured to said frame, a shaft journalled near the rear portion of the said frame and adapted to move vertically in said slots, a topper beam through which the last-mentioned shaft is passed, and which shaft and beam move vertically up and down, springs to control the movement of said beam, a topping blade secured on the lower end of said beam, spaced apart sprocket wheels carried on said last-mentioned shaft, a pair of spaced apart sprocket wheels carried on the shaft which is in said tightener frame, spaced apart foliage chains over said last-mentioned pairs of sprocket wheels and passing over said first-mentioned spaced apart sprocket wheels to impart rotation thereto, said chains having blades secured thereto having teeth on the outer side thereof, and means to raise and lower said beam.

In testimony whereof I have affixed my signature.

CARL A. J. ANDERSEN.